US012570304B2

(12) United States Patent　　　　(10) Patent No.:　US 12,570,304 B2
Kawano et al.　　　　　　　　　　　　(45) Date of Patent:　　Mar. 10, 2026

(54) ELECTRONIC DEVICE, VEHICLE, NOTIFICATION CONTROL METHOD, AND STORAGE MEDIUM

(71) Applicant: ISUZU MOTORS LIMITED, Tokyo (JP)

(72) Inventors: Takashi Kawano, Fujisawa (JP); Ai Takeda, Fujisawa (JP); Masahiro Seki, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 167 days.

(21) Appl. No.: 18/466,964

(22) Filed: Sep. 14, 2023

(65) Prior Publication Data

US 2024/0101142 A1　　Mar. 28, 2024

(30) Foreign Application Priority Data

Sep. 22, 2022　(JP) ................................. 2022-151553

(51) Int. Cl.
B60W 50/14　　　(2020.01)
B60W 40/105　　(2012.01)
G06V 20/58　　　(2022.01)

(52) U.S. Cl.
CPC .......... B60W 50/14 (2013.01); B60W 40/105 (2013.01); G06V 20/582 (2022.01); B60W 2050/146 (2013.01)

(58) Field of Classification Search
CPC .............. B60W 50/14; B60W 40/105; B60W 2050/146; B60W 2520/10; B60W 2540/215; B60W 2555/60; B60W 2556/50; B60W 2720/10; G06V 20/582; G06V 20/20
See application file for complete search history.

(56) References Cited

U.S. PATENT DOCUMENTS 6,008,740　A　*　12/1999　Hopkins　.......... G08G 1/096716
　　　　　　　　　　　　　　　　　　　　　　　340/936
2011/0040621　A1*　2/2011　Ginsberg　........... G06Q 30/0251
　　　　　　　　　　　　　　　　　　　　　　　340/905
2017/0178591　A1　6/2017　Takatsudo
(Continued)

FOREIGN PATENT DOCUMENTS

AU　　2003100716 A4　*　11/2003
JP　　2000121370 A　　　4/2000
JP　　2010-152444 A　　　7/2010
(Continued)

*Primary Examiner* — Brian A Zimmerman
*Assistant Examiner* — Cal J Eustaquio
(74) *Attorney, Agent, or Firm* — Shih IP Law Group, PLLC

(57)　　　　　　　　ABSTRACT

An electronic device includes a first acquisition part that acquires a first set speed set on the basis of a speed limit which is (i) recognized on the basis of an image of a sign of a road on which a vehicle is located, captured by an imaging part or (ii) identified from map information of the road; a second acquisition part that acquires a second set speed set by a user of the vehicle; and a notification control part that causes a notification part to provide a first notification when a vehicle speed exceeds the first set speed, and causes the notification part to provide a second notification which is distinguishable from the first notification when the vehicle speed exceeds the second set speed.

15 Claims, 5 Drawing Sheets

(56)             References Cited

U.S. PATENT DOCUMENTS

2018/0239971 A1*   8/2018   Kim ...................... G06V 20/58

FOREIGN PATENT DOCUMENTS

| JP | 2017-117040 A | 6/2017 |
| JP | 2018185739 A | 11/2018 |
| JP | 2019-059359 A | 4/2019 |
| JP | 2020-060929 A | 4/2020 |
| WO | 2021-002239 A1 | 1/2021 |

* cited by examiner

| | OFFSET AMOUNT |
|---|---|
| FIRST ADDITION SPEED | + 2 km/h |
| SECOND ADDITION SPEED | + 5 km/h |
| THIRD ADDITION SPEED | + 1 0 km/h |

FIG. 3

VEHICLE SPEED

ELECTRONIC DEVICE, VEHICLE, NOTIFICATION CONTROL METHOD, AND STORAGE MEDIUM

CROSS-REFERENCE TO RELATED APPLICATIONS

The present application claims priority to Japanese Patent Applications number 2022-151553, filed on Sep. 22, 2022 contents of which are incorporated herein by reference in their entirety.

BACKGROUND OF THE INVENTION

The present disclosure relates to an electronic device, a vehicle, a notification control method, and a storage medium. In recent years, there has been proposed technology for causing a vehicle to travel in accordance with a speed limit which is recognized on the basis of an image of a road sign captured with a dash cam or a speed limit identified from map information, and Japanese Unexamined Patent Application Publication No. 2020-60929 discloses technology that provides notification when the speed of a vehicle exceeds a warning speed corresponding to the speed limit.

However, although the warning speed corresponds to the speed limit of the road in the above-described technology, a vehicle speed at which a driver wishes to be notified of a warning or the like during driving may vary depending on a situation of the vehicle, and so such a vehicle speed does not necessarily match the speed limit. For this reason, there are cases where notification cannot be provided at a timing intended by the driver.

BRIEF SUMMARY OF THE INVENTION

The present disclosure focuses on this point, and its object is to make it possible to provide notification at a timing that reflects a driver's intention as well.

A first aspect of the present disclosure provides an electronic device including: a first acquisition part that acquires a first set speed set on the basis of a speed limit which is (i) recognized on the basis of an image of a sign of a road on which a vehicle is located, captured by an imaging part or (ii) identified from map information of the road; a second acquisition part that acquires a second set speed set by a user of the vehicle; and a notification control part that causes a notification part to provide a first notification when a speed of the vehicle exceeds the first set speed, and causes the notification part to provide a second notification which is distinguishable from the first notification when the speed exceeds the second set speed.

A second aspect of the present disclosure provides a vehicle including the above described electronic device and an imaging part that captures the sign of the road.

A third aspect of the present disclosure provides a notification control method executed by a processor including: acquiring a first set speed set on the basis of a speed limit which is (i) recognized on the basis of an image of a sign of a road on which a vehicle is located, captured by an imaging part or (ii) identified from map information of the road; acquiring a second set speed set by a user of the vehicle; and causing a notification par to provide a first notification when a speed of the vehicle exceeds the first set speed, and causing the notification part to provide a second notification which is distinguishable from the first notification when the speed exceeds the second set speed.

A fourth aspect of the present disclosure provides a storage medium storing a program for causing a processor to execute: acquiring a first set speed set on the basis of a speed limit which is (i) recognized on the basis of an image of a sign of a road on which a vehicle is located, captured by an imaging part or (ii) identified from map information of the road; acquiring a second set speed set by a user of the vehicle; and causing a notification par to provide a first notification when a speed of the vehicle exceeds the first set speed, and causing the notification part to provide a second notification which is distinguishable from the first notification when the speed exceeds the second set speed.

BRIEF DESCRIPTION OF THE DRAWINGS

FIG. 3 illustrates a plurality of addition speeds.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention

Outline of a Vehicle

Figure 1:
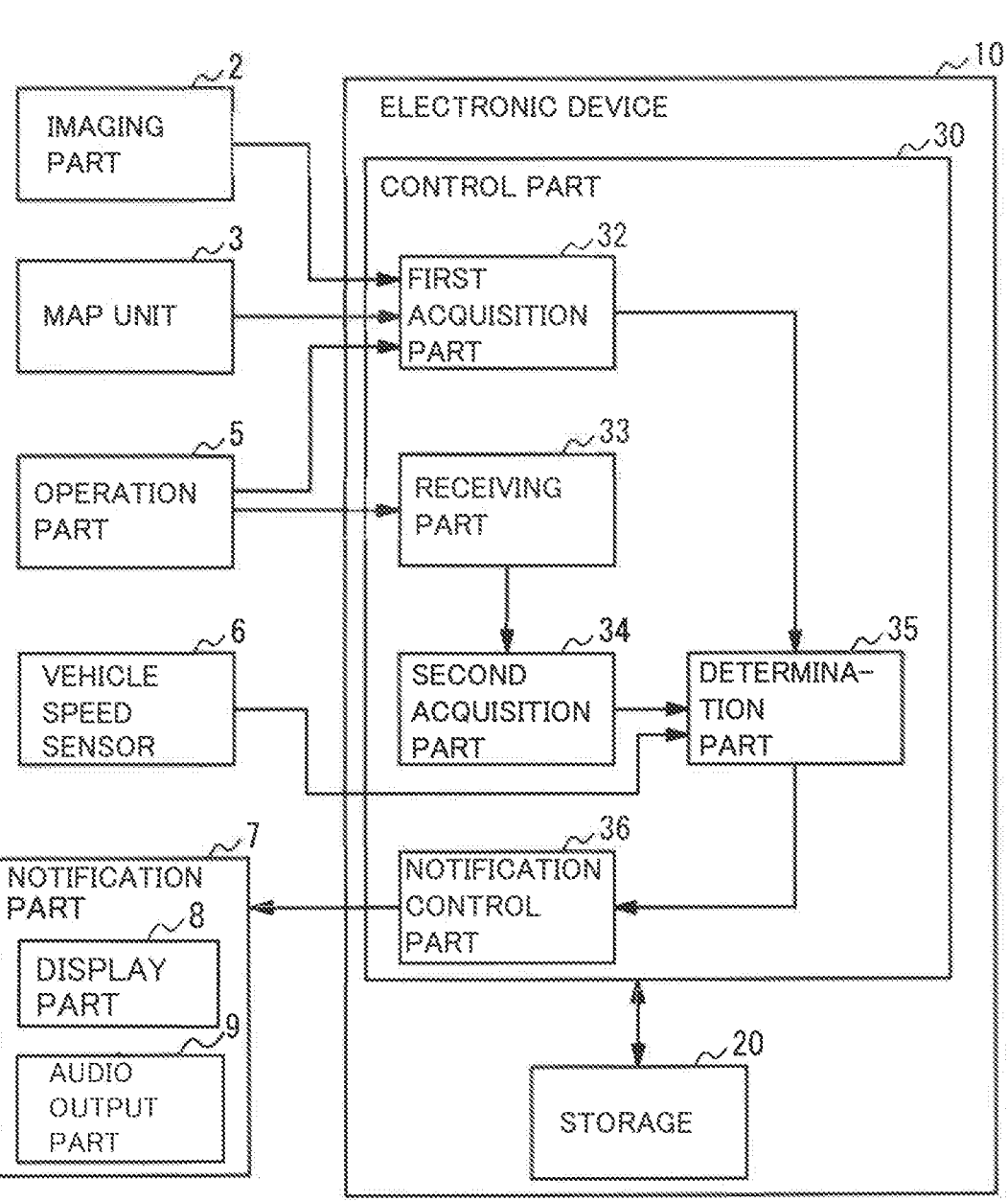
FIG. 1 shows a configuration of a vehicle V.

FIG. 1 shows a configuration of a vehicle V. Here, the vehicle V is a heavy vehicle such as a truck, but the present embodiment is not limited thereto. The vehicle V includes an imaging part 2, a map unit 3, an operation part 5, a vehicle speed sensor 6, a notification part 7, and an electronic device 10.

The imaging part 2 captures the surroundings of the vehicle to generate a captured image. For example, the imaging part 2 captures a sign of a road on which the vehicle is located to generate a captured image. The imaging part 2 outputs the generated captured image to the electronic device 10.

The map unit 3 receives map data from an external server that provides the map data, and stores the received map data. When the map unit 3 receives a notification that the map data has been updated from the external server, the map unit 3 acquires the updated map data.

The operation part 5 is a part operated by a driver who is a user of the vehicle. The operation part 5 includes an ignition key provided on a steering wheel of the vehicle, for example. The driver performs an operation of inputting a set speed for the vehicle via the operation part 5.

The vehicle speed sensor 6 detects the speed (hereinafter, also referred to as a vehicle speed) of the vehicle. The vehicle speed sensor 6 outputs the detected vehicle speed to the electronic device 10.

The notification part 7 has a function of providing notification in response to an instruction from the electronic device 10. Although details will be described later, the notification part 7 provides a first notification when the vehicle speed exceeds a first set speed (a set speed that has been set on the basis of a speed limit of the road), and provides a second notification which is distinguished from the first notification when the vehicle speed exceeds a second set speed (a set speed set by the user). The notification part 7 includes a display part 8 and an audio output part 9.

The display part 8 displays information about the state and the like of the vehicle. The display part 8 has a function of displaying the speed limit of the road on which the vehicle travels. The display part 8 is provided on an instrument panel of the vehicle, for example, but is not limited thereto, and may be provided on an information terminal used by a driver, for example.

Figure 2:
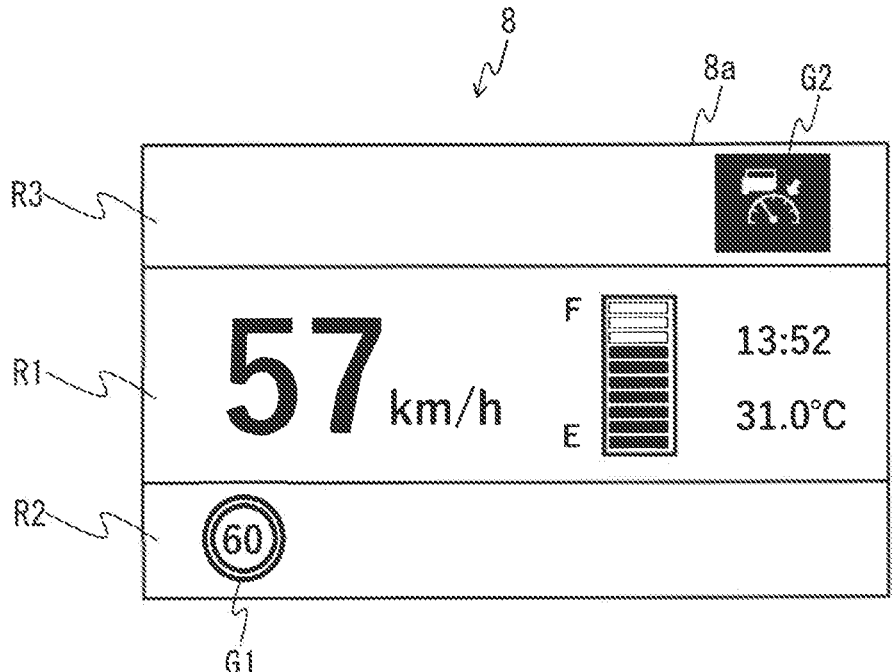
FIG. 2 is a schematic diagram showing a display example of a display part 8.

FIG. 2 is a schematic diagram showing a display example of the display part 8. The display part 8 includes a display screen 8a that displays character information, an icon, and the like. The display screen 8a includes a first display region R1, a second display region R2, and a third display region R3.

In the first display region R1, a current speed of the vehicle, fuel level, time, temperature, or the like are displayed. In the present embodiment, the first display region R1 corresponds to a display region for displaying speed information about the vehicle speed.

A road sign is displayed in the second display region R2. Here, an icon G1 indicating a speed limit of the road on which the vehicle is traveling is displayed. The icon G1 corresponds to an icon related to the speed limit. When the vehicle speed exceeds the first set speed based on the speed limit, the display part 8 flashes the icon G1 for a predetermined time (for example, 5 seconds).

An icon G2 indicating that the user has set a set speed is displayed in the third display region R3. If the user has not set a set speed, the icon G2 is not displayed in the third display region R3. The icon G2 corresponds to a second icon related to the second set speed. When the vehicle speed exceeds the second set speed, the display part 8 flashes the icon G2 for a predetermined time (for example, 5 seconds).

The icons G1 and G2 are displayed at positions apart from each other on the display screen 8a. Here, the icons G1 and G2 are positioned apart from each other so as to sandwich the first display region R1 on the display screen 8a. Specifically, the icons G1 and G2 are arranged at the corners of the display screen 8a. By positioning the icons G1 and G2 as described above, the driver can easily identify the icons G1 and G2 when the icons G1 and G2 flash.

When the vehicle speed exceeds the set speed, the audio output part 9 outputs sound as the first notification or the second notification. The audio output part 9 is a speaker provided in the vehicle, and outputs the sound so as to be heard by the driver, for example.

The electronic device 10 recognizes a speed limit of the road on which the vehicle is traveling, and causes the display part 8 to display the speed limit. For example, the electronic device 10 causes the display screen 8a to display the icon G1 indicating the speed limit. Also, the electronic device 10 causes the notification part 7 (specifically, the display part 8 and the audio output part 9) to provide the first notification when the vehicle speed exceeds the first set speed that has been set on the basis of the speed limit of the road, and causes the notification part 7 to provide the second notification when the vehicle speed exceeds the second set speed set by the user. By doing this, the driver who is the user of the vehicle can easily grasp whether the vehicle speed has exceeded the first set speed or the second set speed.

Detailed Configuration of the Electronic Device

Detailed configuration of the electronic device 10 will be described with reference to FIG. 1. The electronic device 10 includes a storage 20 and a control part 30.

The storage 20 includes a read only memory (ROM) storing a basic input output system (BIOS) of a computer or the like, and a random access memory (RAM) serving as a work area. The storage 20 is a large-capacity storage device such as a hard disk drive (HDD), a solid state drive (SSD), and the like that stores an operating system (OS), an application program, and various types of information to be referred to at the time of executing the application program.

The control part 30 is a processor such as a central processing unit (CPU) or a graphics processing unit (GPU). The control part 30 functions as a first acquisition part 32, a receiving part 33, a second acquisition part 34, a determination part 35, and a notification control part 36 by executing the program stored in the storage 20.

The first acquisition part 32 acquires the first set speed set on the basis of the speed limit of the road on which the vehicle is located. For example, the first acquisition part 32 identifies a sign indicating a speed limit in the captured image generated by the imaging part 2, and acquires the first set speed. In other words, the first acquisition part 32 acquires, as the speed limit, a speed which is recognized on the basis of an image captured by the imaging part 2, the image being an image of the sign of the road on which the vehicle is located. The first acquisition part 32 may identify the speed limit of the road on which the vehicle travels from the map data (map information) stored in the map unit 3 and acquire the first set speed. In other words, the first acquisition part 32 acquires, as the speed limit, a speed identified from the map information of the road. The first acquisition part 32 can identify a position of a subject vehicle using a global positioning system (GPS) unit provided in the vehicle, and can identify a speed limit of the road on which the subject vehicle travels, on the basis of the identified position of the subject vehicle.

The first acquisition part 32 may update the first set speed every time the speed limit recognized on the basis of the image captured by the imaging part 2 changes. Since the speed limit of the road on which the vehicle travels may vary depending on sections, the speed limit recognized on the basis of the image captured by the imaging part 2 also varies depending on sections of the road. Further, the first acquisition part 32 may update the first set speed every time the speed limit identified from the map data changes. Therefore, in a case where the vehicle travels on a road in which speed limit varies depending on the sections, the first acquisition part 32 updates the first set speed based on the speed limit. Further, the first acquisition part 32 may update the first set speed on the basis of the speed limit identified from the map data in a case where the speed limit identified on the basis of the map data and position information of the vehicle changes after setting the first set speed on the basis of the speed limit recognized on the basis of the image captured by the imaging part 2. For example, in a case where the vehicle enters a narrow street with a lower speed limit from a main road, the first set speed need not be an appropriate set speed for said street (narrow street) on which the vehicle travels if the vehicle continues to travel at the first set speed based on the speed limit recognized on the basis of the image captured by the imaging part 2 while traveling on the main road. In such a case, by updating the first set speed in response to detection of a change in the speed limit from the map data, the vehicle can travel at the appropriate set speed.

The first acquisition part 32 sets speed obtained by adding a predetermined speed to the speed limit as the first set speed. That is, the first set speed is a speed obtained by offsetting the speed limit by the predetermined speed. By doing this, the speed at which the notification is provided can be changed according to the driver's intention. The predetermined speed may be set by the driver. For example, the driver adjusts a value of the speed to be added to the speed limit via the operation part 5. The first acquisition part 32 may set the speed obtained by subtracting the predetermined speed from the speed limit as the first set speed. In other words, a negative value can be used as the predetermined speed. As will be described later, in a case where a warning is issued in response to exceeding of the first set speed, by setting a value lower than the speed limit by what has been offset as the first set speed, it becomes possible to notify the driver in advance that the vehicle speed has approached the speed limit.

The receiving part 33 receives an input operation via the operation part 5 by the driver of the vehicle. The receiving part 33 receives one of a plurality of addition speeds as a predetermined speed to be added to the speed limit.

FIG. 3 illustrates a plurality of addition speeds. The table shown in FIG. 3 is stored in the storage 20, for example. Here, the plurality of addition speeds are a first addition speed, a second addition speed, and a third addition speed, but they are not limited thereto. The first addition speed is a speed at which an offset amount with respect to the speed limit is set to 2 km/h, the second addition speed is a speed at which the offset amount with respect to the speed limit is set to 5 km/h, and the third addition speed is a speed at which the offset amount with respect to the speed limit is set to 10 km/h. When the driver selects one of the first addition speed, the second addition speed, and the third addition speed via the ignition key of the operation part 5, the receiving part 33 receives said one addition speed selected by the driver.

The first acquisition part 32 acquires the first set speed by adding the one addition speed received by the receiving part 33 to the speed limit. By selecting one addition speed from among the plurality of addition speeds, the first acquisition part 32 can acquire the first set speed reflecting the driver's intention.

The second acquisition part 34 acquires the second set speed set by the driver of the vehicle. For example, the second acquisition part 34 acquires the second set speed by having the receiving part 33 receive the second set speed selected by the driver via the operation part 5. The driver can set the second set speed not only while the vehicle is traveling but also before the vehicle starts traveling. Further, the driver can change the set second set speed at any timing. Therefore, the second acquisition part 34 acquires the second set speed before the start of traveling or acquires the second set speed during traveling.

The second set speed is any speed set by the driver. For example, when the vehicle travels on a road with a fixed speed limit (e.g., highways), the driver sets a speed different from the speed limit of the road (speed smaller than the speed limit of the road) as the second set speed. Specifically, when the speed limit of the road is 100 km/h, the driver sets 90 km/h as the second set speed. In particular, in a case where the vehicle is a truck, the driver tends to set the second set speed lower than the first set speed in consideration of safety and the like since its carried load may be large or its vehicle height may be high. On the other hand, in a case where the vehicle is a passenger vehicle and is travelling on a road with less traffic, the driver may set the second set speed greater than the first set speed. In this manner, the driver sets the second set speed so as to reflect his or her intention.

The determination part 35 determines whether or not the speed (vehicle speed) of the vehicle exceeds the first set speed or the second set speed. For example, the determination part 35 determines whether or not the vehicle speed detected by the vehicle speed sensor 6 exceeds the first set speed acquired by the first acquisition part 32 or the second set speed acquired by the second acquisition part 34.

Figure 4:
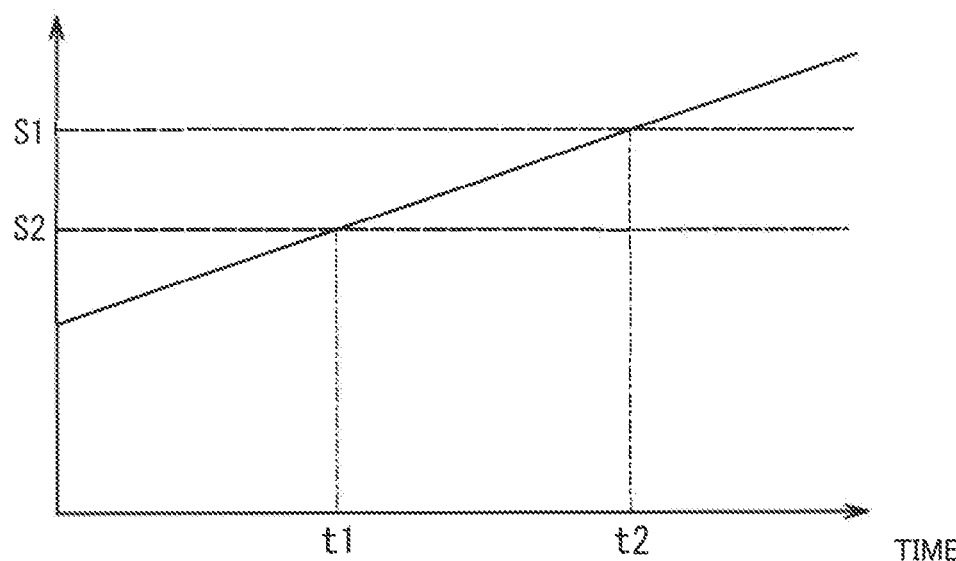
FIG. 4 shows a relationship between a vehicle speed, a first set speed S1, and a second set speed S2.

FIG. 4 shows a relationship between a vehicle speed, a first set speed S1, and a second set speed S2. Here, it is assumed that the second set speed S2 is smaller than the first set speed S1, and the vehicle speed gradually increases as the vehicle accelerates. The vehicle speed is set to the second set speed S2 at a timing t1, and the vehicle speed is set to the first set speed S1 at a timing t2. The determination part 35 determines that the vehicle speed has exceeded the second set speed S2 immediately after the timing t1, and then determines that the vehicle speed has exceeded the first set speed S1 immediately after the timing t2. In FIG. 4, the second set speed S2 is less than the first set speed S1, but the embodiment is not limited thereto. For example, the second set speed S2 may be greater than the first set speed S1. For example, in a case where the speed limit is 80 km/h, the first set speed S1 is 82 km/h and the second set speed S2 is 90 km/h.

The notification control part 36 controls the providing of notification by the notification part 7 on the basis of a determination result by the determination part 35. The notification control part 36 causes the notification part 7 to provide the first notification when the vehicle speed exceeds the first set speed, and causes the notification part 7 to provide the second notification which is distinguishable from the first notification when the vehicle speed exceeds the second set speed. That is, when the determination part 35 determines that the vehicle speed has exceeded the first set speed, the notification control part 36 causes the notification part 7 (specifically, the display part 8 and the audio output part 9) to provide the first notification, and when the determination part 35 determines that the vehicle speed has exceeded the second set speed, the notification control part 36 causes the notification part 7 to provide the second notification. Since the notification part 7 provides the first notification and the second notification in a distinguishable manner, the driver of the vehicle can easily determine whether the vehicle has exceeded the first set speed or the vehicle has exceeded the second set speed.

When the vehicle speed exceeds the first set speed, the notification control part 36 changes a display mode of a first icon (the icon G1 in FIG. 2) related to the speed limit as the first notification, and when the vehicle speed exceeds the second set speed, the notification control part 36 changes a display mode of a second icon (icon G2 in FIG. 2) related to the second set speed as the second notification. By changing the display mode of the first icon G1 or the second icon G2 in this manner, the driver can easily recognize whether the speed has exceeded the first set speed or the second set speed.

The notification control part 36 may flash the first icon G1 of the display screen 8a of the display part 8 when the vehicle speed exceeds the first set speed (time t1 in FIG. 4), and may flash the second icon G2 of the display screen 8a of the display part 8 when the vehicle speed exceeds the second set speed (time t2 in FIG. 4). By flashing the first icon G1 or the second icon G2 in this manner, it is easy to identify the first icon G1 or the second icon G2 on the display screen 8a. The notification control part 36 flashes the first icon G1 and the second icon G2 in the above description, but the present embodiment is not limited to this. For example, the notification control part 36 may change colors of the first icon G1 and the second icon G2.

The notification control part 36 may cause the audio output part 9 to output sound together with changing the display modes of the first icon G1 and the second icon G2 on the display part 8. When the driver is driving without looking at the display part 8, this triggers him/her to closely watch the display part 8 because he/she becomes aware that the vehicle speed may have exceeded the set speed. Instead of changing the display mode of the icon on the display part 8, the notification control part 36 may cause the audio output part 9 to output an alarm as the first notification and the second notification. That is, the notification control part 36 may provide a first alarm as the first notification and a second alarm that can be distinguished from the first alarm as the second notification. In this case, the volume and type of sound of the second alarm are different from those of the first alarm.

In view of complying with speed limits of road signs (speed limits stipulated by traffic laws), it is desirable that the second set speed be equal to or lower than the first set speed. Therefore, it is desirable that the notification control part 36 causes the notification part 7 to provide the first notification in a case where the speed exceeds the first set speed, and causes the notification part 7 to provide the second notification in a case where the speed exceeds the second set speed and does not exceed the first set speed.

In a case where the second set speed exceeds the first set speed, the notification control part 36 may cause the notification part 7 to provide a third notification. When the speed limit of the road on which the vehicle is traveling becomes lower, the first set speed also becomes lower, and therefore there may be a case where the second set speed exceeds the first set speed. In such a case, providing the third notification can prompt the driver to change the second set speed. It is desirable, from the point of view of distinguishability, that the third notification has a different notification mode from the first notification and the second notification, but it is not limited to this. The third notification may be the same notification mode as the first notification or the second notification. Further, when the second set speed exceeds the first set speed while the vehicle is traveling, the second acquisition part 34 may update the second set speed to a value less than or equal to the first set speed. In this case, the second acquisition part 34 may set, as the second set speed, a value obtained by applying a coefficient equal to or less than 1 set to the first set speed by the user in advance, for example. After updating the second set speed, the second acquisition part 34 restores the second set speed to a second set speed before the update (also referred to as an initial set speed), which is initially set by the user, triggered by the fact that the first set speed becoming higher than the second set speed.

The user who sets the second set speed is the driver of the vehicle in the above description, but the present embodiment is not limited thereto. It is also possible for an administrator of a vehicle to set the second set speed. For example, in a case where the administrator remotely operates the vehicle, the administrator corresponds to the user who sets the second set speed.

Flow of Processing Performed by the Electronic Device

Figure 5:
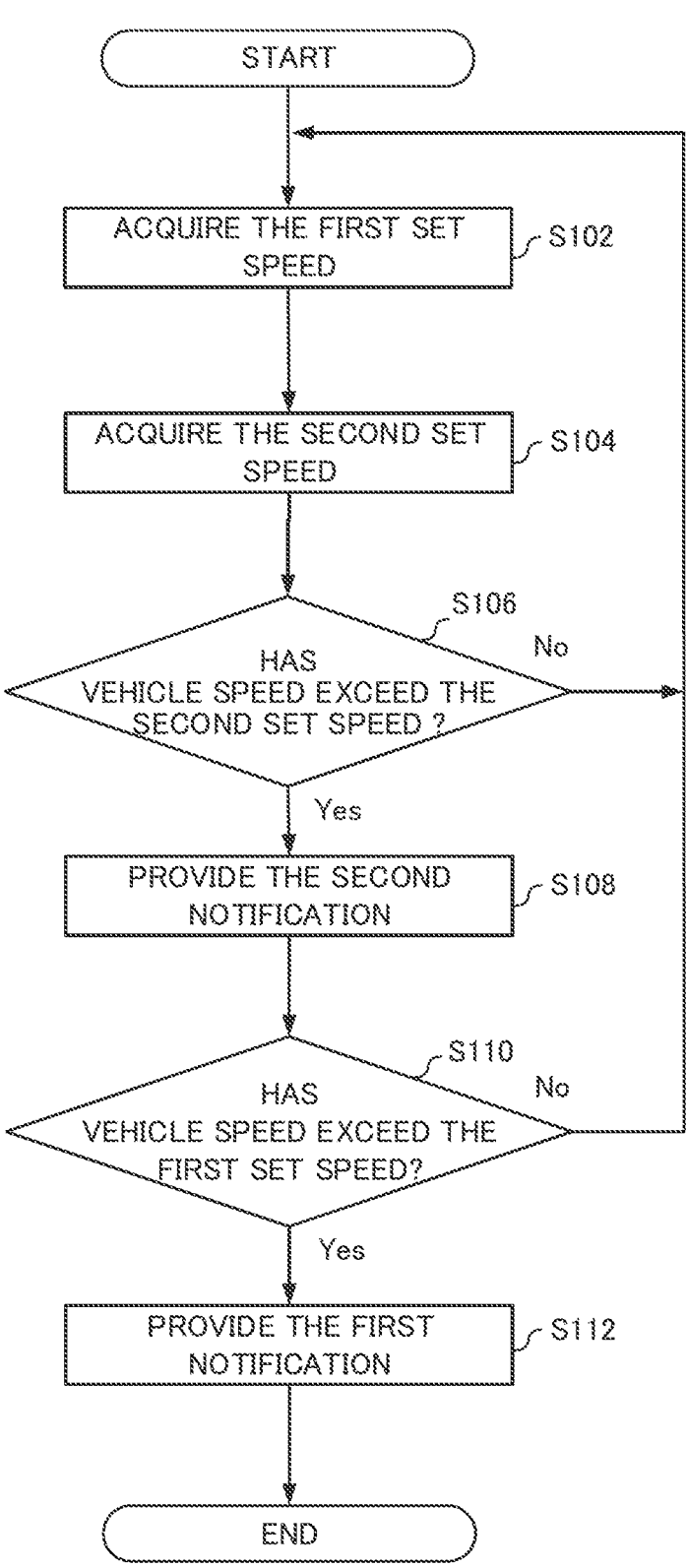
FIG. 5 is a flowchart showing an operation of an electronic device 10.

FIG. 5 is a flowchart showing operations of the electronic device 10. The flowchart shown in FIG. 5 is continuously executed while a vehicle is traveling. The present flowchart illustrates a process which is executed when the second set speed is lower than the first set speed.

First, the first acquisition part 32 acquires a first set speed set on the basis of a speed limit of a road on which the vehicle is located (step S102). For example, the first acquisition part 32 acquires the first set speed obtained by adding a predetermined speed to a speed limit indicated on a sign captured by the imaging part 2 or a speed limit identified from map information of the road.

Next, the second acquisition part 34 acquires a second set speed set by a user of the vehicle (step S104). For example, the second acquisition part 34 acquires the second set speed set by the user via the operation part 5. The process of step S104 may be executed before the process of step S102.

Next, the determination part 35 determines whether a vehicle speed detected by the vehicle speed sensor 6 has exceeded the second set speed (step S106). When the vehicle speed exceeds the second set speed in step S106 (Yes), the notification control part 36 causes the notification part 7 to provide a second notification (step S108). For example, the notification control part 36 causes the second icon G2 of the display screen 8a to flash for a predetermined time (for example, 5 seconds) and causes the audio output part 9 to generate sound. On the other hand, when the vehicle speed does not exceed the second set speed in step S106 (No), processing returns to the process of step S102.

Then, the determination part 35 determines whether or not the vehicle speed has exceeded the first set speed (step S110). When the vehicle speed exceeds the first set speed in step S110 (Yes), the notification control part 36 causes the notification part 7 to provide a first notification (step S112). On the other hand, when the vehicle speed does not exceed the first set speed in step S110 (No), processing returns to the process of step S102. For example, the notification control part 36 causes the first icon G1 of the display screen 8a to flash for a predetermined time (for example, 5 seconds) and causes the audio output part 9 to generate sound. The electronic device 10 repeats the processes of steps S102 to S112 described above while the vehicle is traveling.

Effects of the Present Embodiment

The electronic device 10 of the embodiment described above acquires the first set speed set on the basis of the speed limit of the road on which the vehicle is located and the second set speed set by the user of the vehicle. The electronic device 10 causes the notification part 7 to provide the first notification when the vehicle speed exceeds the first set speed, and causes the notification part 7 to provide the second notification which is distinguishable from the first notification when the vehicle speed exceeds the second speed. As described above, by providing the first notification or the second notification on the basis of the second set speed in addition to the first set speed, it is possible not only to provide the notification when the vehicle speed exceeds the speed limit of the road, but also to provide the notification at the timing that reflects the driver's intention or the situation of the vehicle. As a result, it is possible to alert the user at an appropriate timing, and safety of the vehicle during the traveling can be improved.

The present disclosure is explained on the basis of the exemplary embodiments. The technical scope of the present disclosure is not limited to the scope explained in the above embodiments and it is possible to make various changes and modifications within the scope of the disclosure. For example, all or part the apparatus can be configured with any unit which is functionally or physically dispersed or integrated. Further, new exemplary embodiments generated by arbitrary combinations of them are included in the exemplary embodiments of the present disclosure. Further, effects of the new exemplary embodiments brought by the combinations also have the effects of the original exemplary embodiments.

What is claimed is:

1. An electronic device comprising:

a first acquisition part that acquires a first set speed set on the basis of a speed limit which is (i) recognized on the basis of an image of a sign of a road on which a vehicle is located, captured by an imaging part or (ii) identified from map information of the road;

a second acquisition part that acquires a second set speed set arbitrarily by a user of the vehicle; and a notification control part that causes a notification part to provide a first notification when a speed of the vehicle exceeds the first set speed, and causes the notification part to provide a second notification which is distinguishable from the first notification when the speed exceeds the second set speed, wherein the first acquisition part updates the first set speed when the speed limit changes, and the notification control part causes the notification part to provide a third notification when the second set speed exceeds the first set speed updated by the first acquisition part.

2. The electronic device according to claim 1, wherein the first set speed is a set speed obtained by adding a predetermined speed to the speed limit.

3. The electronic device according to claim 2, further comprising:

a receiving part that receives one of a plurality of addition speeds as the predetermined speed, wherein the first acquisition part acquires the first set speed obtained by adding the one addition speed received by the receiving part to the speed limit.

4. The electronic device according to claim 1, wherein the notification part includes a display part that displays a first icon related to the speed limit and a second icon related to the second set speed on a screen, and the notification control part changes a display mode of the first icon when the speed exceeds the first set speed, and changes a display mode of the second icon when the speed exceeds the second set speed.

5. The electronic device according to claim 4, wherein the notification control part flashes the first icon when the speed exceeds the first set speed and flashes the second icon when the speed exceeds the second set speed.

6. The electronic device according to claim 1, wherein the notification part includes a display part that displays a first icon related to the speed limit and a second icon related to the second set speed on a screen, and the first icon and the second icon are displayed at positions apart from each other on the screen.

7. The electronic device, according to claim 6, wherein the display part includes a display region for displaying speed information about the speed of the vehicle, and the first icon and the second icon are positioned apart from each other so as to sandwich the display region on the screen.

8. The electronic device according to claim 1, wherein the first acquisition part updates the first set speed every time the speed limit which is recognized on the basis of the image of the sign captured by the imaging part changes.

9. The electronic device according to claim 1, wherein the first acquisition part updates the first set speed on the basis of the speed limit identified from the map information in a case where the speed limit identified from the map information changes after setting the first set speed on the basis of the speed limit recognized on the basis of the image of the sign captured by the imaging part.

10. The electronic device according to claim 1, wherein the second set speed is equal to or lower than the first set speed, and the notification control part causes the notification part to provide the first notification when the speed exceeds the first set speed, and causes the notification part to provide the second notification when the speed exceeds the second set speed and does not exceed the first set speed.

11. The electronic device according to claim 1, wherein the second acquisition part updates the second set speed to a value equal to or lower than the first set speed when the second set speed exceeds the first set speed.

12. The electronic device according to claim 11, wherein after updating the value of the second set speed, the second acquisition part changes the updated second set speed to an initial set speed which is initially set as the second set speed by the user, triggered by the fact that the first set speed is higher than the initial set speed before the update.

13. A vehicle comprising:

the electronic device according to claim 1; and an imaging part that captures the sign of the road.

14. A notification control method executed by a processor comprising:

acquiring a first set speed set on the basis of a speed limit which is (i) recognized on the basis of an image of a sign of a road on which a vehicle is located, captured by an imaging part or (ii) identified from map information of the road;

acquiring a second set speed set arbitrarily by a user of the vehicle; and causing a notification part to provide a first notification when a speed of the vehicle exceeds the first set speed, and causing the notification part to provide a second notification which is distinguishable from the first notification when the speed exceeds the second set speed, wherein the first acquisition part updates the first set speed when the speed limit changes, and the notification control part causes the notification part to provide a third notification when the second set speed exceeds the first set speed updated by the first acquisition part.

15. A non-transitory storage medium storing a program for causing a processor to execute:

acquiring a first acquisition part that acquires a first set speed set on the basis of a speed limit which is (i) recognized on the basis of an image of a sign of a road on which a vehicle is located, captured by an imaging part or (ii) identified from map information of the road;

acquiring a second set speed set arbitrarily by a user of the vehicle; and causing a notification part to provide a first notification when a speed of the vehicle exceeds the first set speed, and causing the notification part to provide a second notification which is distinguishable from the first notification when the speed exceeds the second set speed,

wherein the first acquisition part updates the first set speed when the speed limit changes, and the notification control part causes the notification part to provide a third notification when the second set speed exceeds the first set speed updated by the first acquisition part.

*     *     *     *     *